(12) United States Patent
Gasda et al.

(10) Patent No.: US 7,099,787 B2
(45) Date of Patent: Aug. 29, 2006

(54) TECHNIQUE AND APPARATUS TO MEASURE A FUEL CELL PARAMETER

(75) Inventors: Michael D. Gasda, Albany, NY (US); Michael Misiewicz, Colonie, NY (US); Garnet Prescott, Altamont, NY (US); Steve Buelte, Albany, NY (US); Jon W. Meredith, Kinderhook, NY (US)

(73) Assignee: Plug Power Inc., Latham, NY (US)

( * ) Notice: Subject to any disclaimer, the term of this patent is extended or adjusted under 35 U.S.C. 154(b) by 0 days.

(21) Appl. No.: 10/941,760

(22) Filed: Sep. 15, 2004

(65) Prior Publication Data

US 2006/0074574 A1     Apr. 6, 2006

(51) Int. Cl.
*G06F 19/00* (2006.01)

(52) U.S. Cl. ........................... 702/63; 320/101

(58) Field of Classification Search ............... 702/63, 702/64; 320/101, 127
See application file for complete search history.

(56) References Cited

U.S. PATENT DOCUMENTS

| 4,476,002 | A * | 10/1984 | Howard et al. ............. 204/283 |
| 2004/0151957 | A1 * | 8/2004 | Brooks et al. ................ 429/20 |
| 2004/0220752 | A1 * | 11/2004 | Gopal ......................... 702/31 |

* cited by examiner

*Primary Examiner*—Edward Raymond
(74) *Attorney, Agent, or Firm*—Trop, Pruner & Hu, P.C.

(57) ABSTRACT

A technique includes introducing an electrical perturbation to a fuel cell system during operation of the fuel cell system. This electrical perturbation does not substantially disrupt the operation of the fuel cell system. In response to the perturbation, an electrical parameter of the fuel cell system is measured.

23 Claims, 9 Drawing Sheets

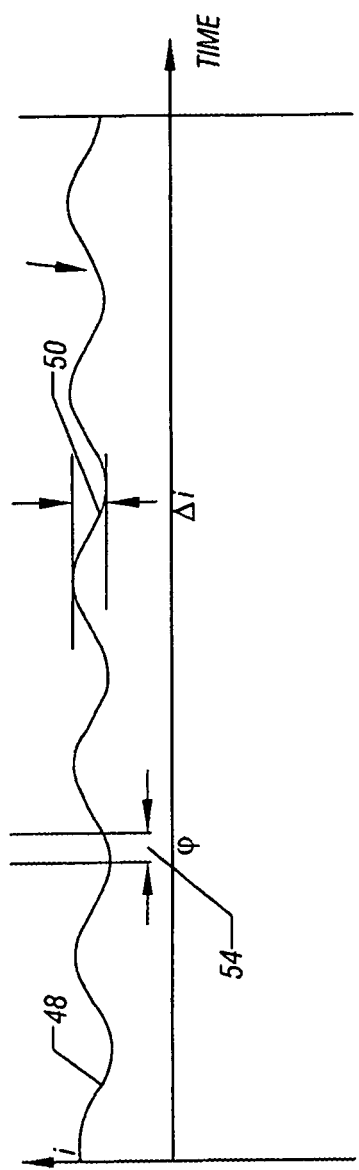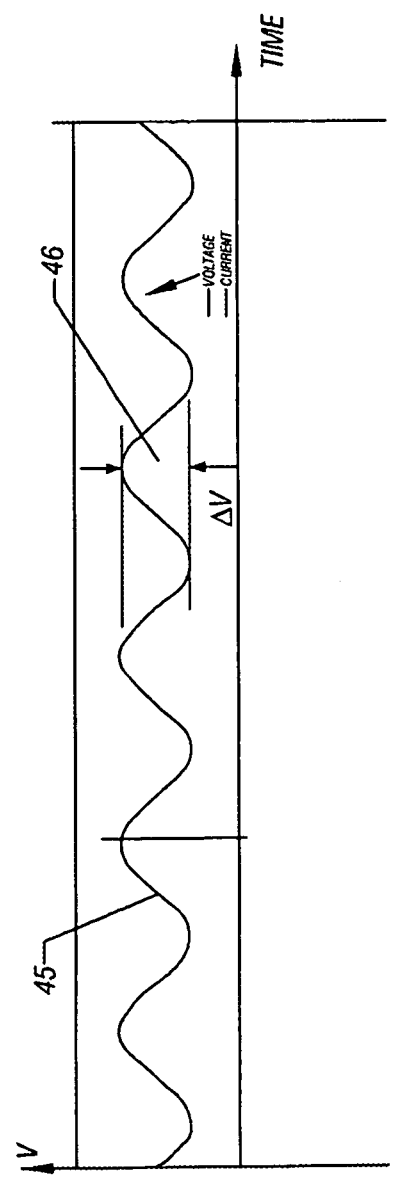

TECHNIQUE AND APPARATUS TO MEASURE A FUEL CELL PARAMETER

BACKGROUND

The invention generally relates to a technique and apparatus to measure a fuel cell parameter.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

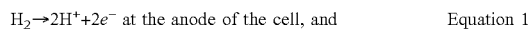

$$H_2 \rightarrow 2H^+ + 2e^- \text{ at the anode of the cell, and} \qquad \text{Equation 1}$$

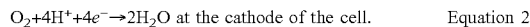

$$O_2 + 4H^+ + 4e^- \rightarrow 2H_2O \text{ at the cathode of the cell.} \qquad \text{Equation 2}$$

A typical fuel cell has a terminal voltage near one volt DC. For purposes of producing much larger voltages, several fuel cells may be assembled together to form a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The fuel cell stack typically is part of a fuel cell system that includes the fuel cell stack; power conditioning circuitry to convert power from the fuel cell stack into the proper form for an AC load; an air blower to furnish an oxidant reactant stream to the fuel cell stack; a fuel processor to furnish a fuel reactant stream to the fuel cell stack; and many other components to control and aid the operation of the fuel cell stack. The fuel cell system typically includes a large number of sensors for purposes of diagnosing conditions in the fuel cell system and controlling the fuel cell system accordingly. For example, these sensors may measure voltages, currents, a humidification level, a carbon monoxide level, etc., for purposes of detecting potential problems with the fuel cell stack, such as problems that are attributable to corrosion, stack assembly (as examples), and for purposes of regulating operation of the stack, such as regulating reactant flow rates to set stoichiometric ratios and regulating the cooling of the stack, (as examples). A potential challenge with the use of many different sensors is that the sensors themselves may complicate the design of the fuel cell system and may significantly contribute to the overall cost of the fuel cell system.

Thus, there is a continuing need for better ways to diagnosis and control a fuel cell system.

SUMMARY

In an embodiment of the invention, a technique includes introducing an electrical perturbation to a fuel cell system during the operation of the fuel cell system. This electrical perturbation does not substantially disrupt the operation of the fuel cell system. In response to the perturbation, an electrical parameter of the fuel cell system is measured.

Advantages and other features of the invention will become apparent from the following drawing, description and claims.

BRIEF DESCRIPTION OF THE DRAWING

FIG. 4 is a waveform of a ripple current that is introduced into the fuel cell system for purposes of measuring an impedance of the system according to an embodiment of the invention.

FIG. 5 is a waveform of a voltage that is attributable to the ripple current according to an embodiment of the invention.

DETAILED DESCRIPTION

Many different conditions and properties of the fuel cell stack may be observed by measuring the AC impedance of a fuel cell. For example, for a low-temperature PEM fuel cell, the AC impedance of the fuel cell is particularly sensitive to humidification conditions. AC impedance on the order of 4 Hz is an indicator of catalyst kinetics. The low frequency AC impedance (on the order of 0.1 Hz) of the fuel cell stack is an indicator of mass transport impedance. Thus, measuring the AC impedance of a fuel cell may be an invaluable tool for diagnosing problems in fuel cell systems in the field.

Conventional control hardware in a fuel cell system is designed to have a relatively slow clock speed, on the order of tens of Hertz, with the cell voltage and stack current measurement time resolution being correspondingly slow. However, meaningful higher frequency AC impedance measurements require a much higher voltage and current time resolution. If such AC impedance measurements are made using digital electronics, such as a dedicated impedance analyzer or personal computer (PC) software plus analog-to-digital hardware conversion hardware, the hardware cost becomes significantly expensive to deploy in many fuel cell systems in the field.

Figure 1:
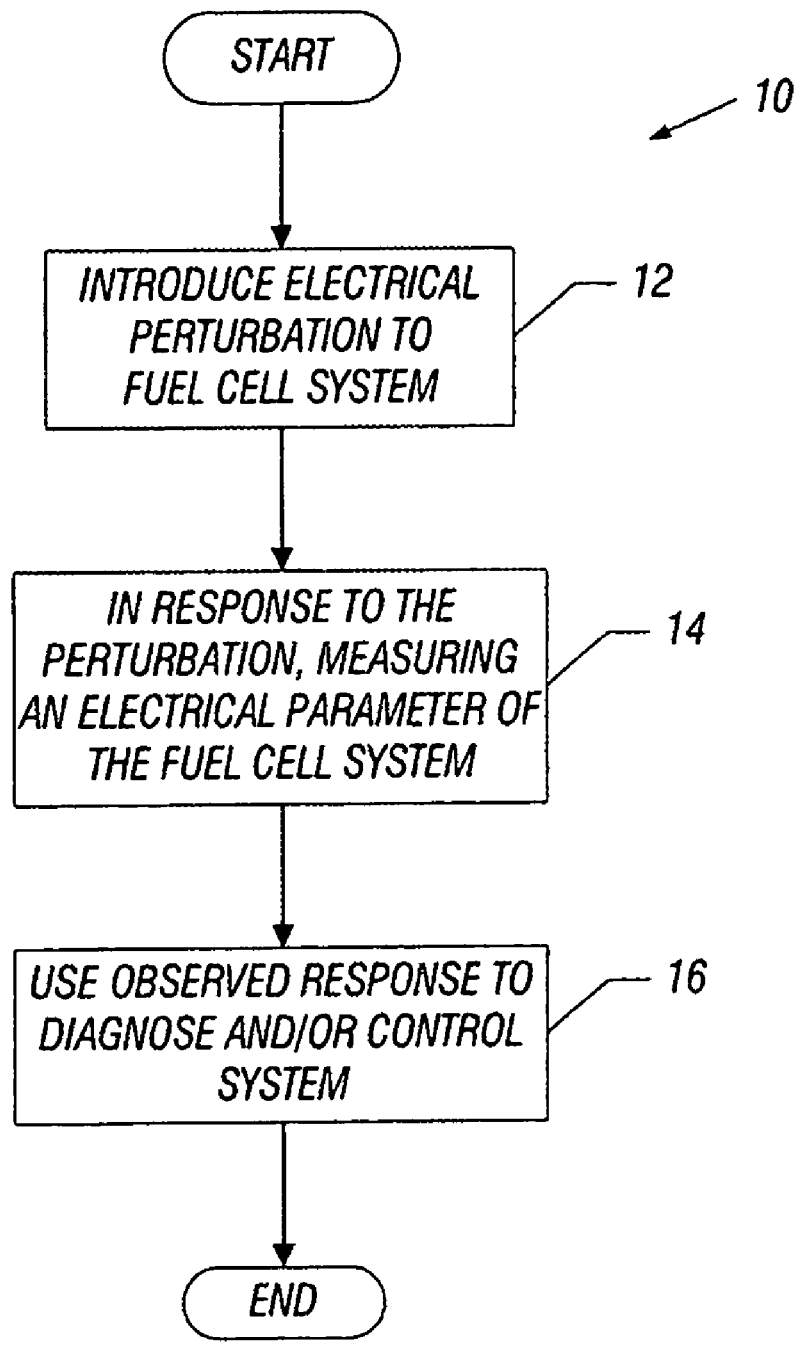
FIGS. 1, 9, 10 and 11 are flow diagrams depicting techniques to control a fuel cell system according to embodiments of the invention.

In accordance with an embodiment of the invention, a technique 10 that is depicted in FIG. 1 may be used to measure an electrical parameter of a fuel cell system, such as the AC impedance, using relatively inexpensive circuitry that operates while the fuel cell system is in its normal, operational state in which the fuel cell system is providing power to a load. More specifically, referring to FIG. 1, the technique 10 includes introducing (block 12) electrical perturbation, to the fuel cell system for purposes of extracting an electrical parameter (such as an AC impedance) of the fuel cell system.

For example, as described further below, this electrical perturbation may be a ripple current or voltage that is injected into the fuel cell system. In the context of this application, the phrase "ripple" means a component that is a relatively small component, as compared to a larger electrical value on which the ripple component is superimposed. For example, the ripple component may be a ripple current that is added to the stack current (for example) and has a magnitude that is 5 percent or less of the magnitude of the stack current. The ripple current has a fundamental frequency that selects a particular impedance to be measured (in some embodiments of the invention), as further described below. Due to its relatively small magnitude, the ripple component does not substantially disrupt operation of the fuel cell system.

Still referring to FIG. 1, in response to the electrical perturbation, an electrical parameter of the fuel cell system is measured, pursuant to block 14 of the technique 10. As mentioned above, this electrical parameter may be an AC impedance of the fuel cell system, in some embodiments of the invention. The observed response is then used (block 16) to diagnosis and/or control the fuel cell system.

Figure 2:
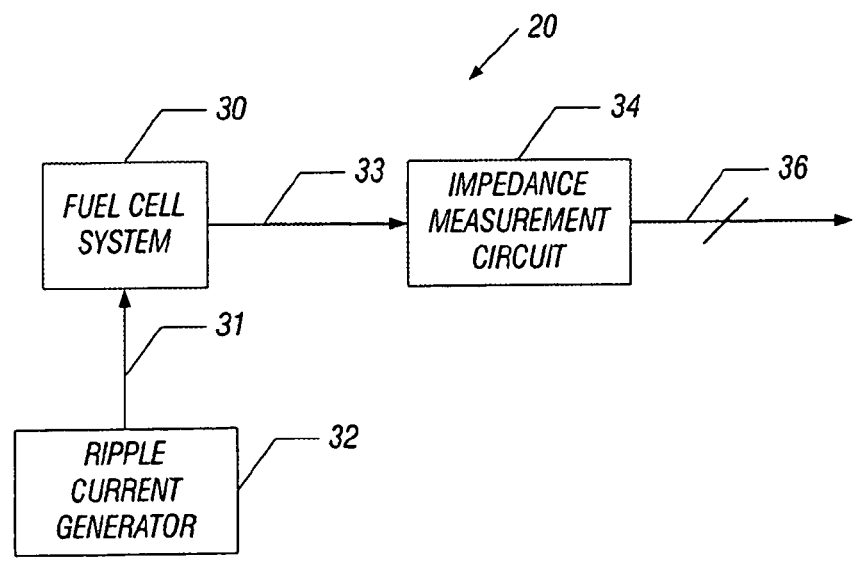
FIG. 2 is a block diagram depicting a system to measure an impedance of a fuel cell system according to an embodiment of the invention.
Figure 3:
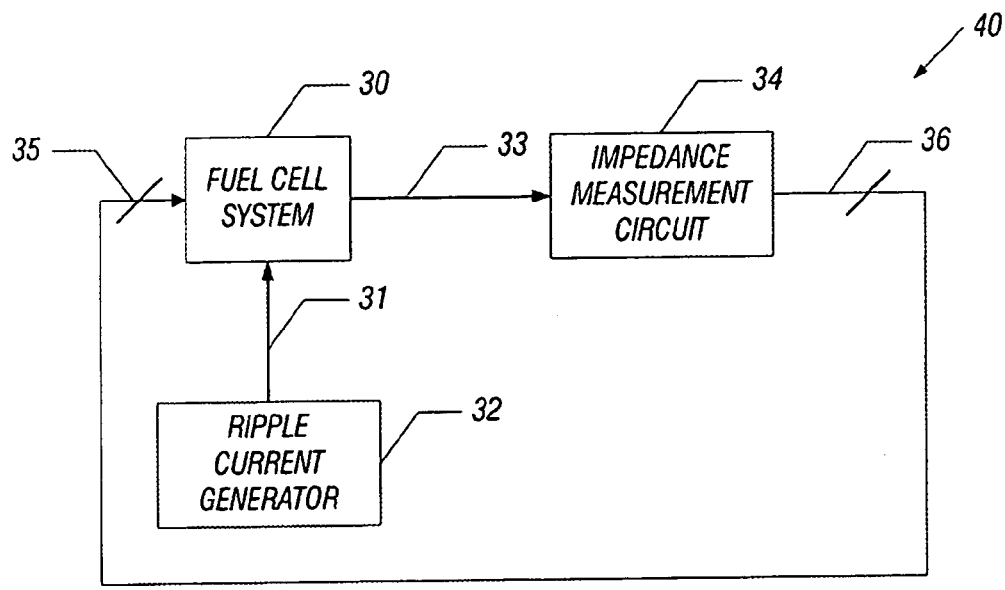
FIG. 3 is a block diagram depicting a system to control a fuel cell system based on a measured impedance of the fuel cell system according to an embodiment of the invention.

Referring to FIG. 2, in embodiments of the invention in which the ripple component is a ripple current, an impedance measurement system 20 may include a ripple current generator 32 that is coupled to a fuel cell system 30. The ripple current generator 32 introduces (at its output terminal 31) a ripple current into the fuel cell system 30. For example, this ripple current may constitute a slight perturbation (a magnitude change of less than five percent, for example) on the current that is generated by a fuel cell stack of the fuel cell system 30.

The fuel cell system 30 produces a voltage on a terminal 33 that is observed by an impedance measurement circuit 34 of the system. For example, the terminal 33 may be a stack terminal of a fuel cell stack of the fuel cell system 30 so that the terminal 33 provides a voltage indicative of the stack voltage. In response to the ripple current that is introduced by the ripple current generator 32, the terminal voltage has a ripple voltage component that is observed by the impedance measurement circuit 34 at the terminal 33. Thus, in response to the ripple voltage that is observed at the terminal 33, the impedance measurement circuit 34 (using an impedance calculated from the ripple current and voltage) provides an indication of the measured AC impedance at its output terminals 36.

As another example of an application of the technique 10, in some embodiments of the invention, the technique 10 may be applied to a system 40. The system 40 includes, similar to the system 20, a fuel cell system and a ripple current generator 32. Furthermore, the system 40 includes an impedance measurement circuit 34 that observes a response of the fuel cell system 30 to a ripple current that is injected by the ripple current generator 32. Unlike the system 20, the system 40 connects the output terminals 36 of the impedance measurement circuit 34 back to control input terminals 35 of the fuel cell system 30 so that the fuel cell system 30 is controlled in response to the impedance that is observed by the impedance measurement circuit 34.

Other variations are possible. For example, in some embodiments of the invention, the systems 20 and 40 may be combined so that the AC impedance measurements are used to both diagnose and control the fuel cell system 30.

Referring to FIG. 4, as a more specific example, in some embodiments of the invention, a ripple current 48 may be injected into a fuel cell system. As depicted in FIG. 4, this ripple current 48 has a magnitude (called "$\Delta i$") that represents the deviation of a current of the fuel cell system from its value in the absence of the ripple current 48. For example, the ripple current 48 may be introduced to a stack current of the fuel cell system. This stack current is ideally a DC-only current. However, due to the ripple current 48, the DC value has a slight AC component, i.e., the ripple current 48. Thus, the DC level of the ripple current 48, after being superimposed in the stack current, may be viewed as the DC stack current level.

Referring also to FIG. 5, in response to the ripple current 48, a monitored voltage of the fuel cell system experiences a ripple voltage 45. The magnitude and phase of the ripple voltage is a function of the AC impedance being measured, as further described below. As a more specific example, this ripple voltage 45 may appear on a stack voltage of the fuel cell system. As its name implies, the stack voltage represents the potential across the entire fuel cell stack, i.e., the voltage across all of the fuel cells of the fuel cell stack. Thus, for this example, the ripple voltage 45 may be viewed as the AC voltage that is superimposed upon the stack voltage (the DC component) that is produced by the injection of the ripple current 48. Depending on the particular embodiment of the invention, the ripple voltage 45 may be another voltage of the fuel cell system. For example, in some embodiments of the invention, the ripple voltage 45 may be a ripple component across a particular cell or group of cells of the fuel cell stack. Regardless, however, of where the voltage appears, the ripple component 45 is produced by the introduction of the ripple current 48.

Comparing FIGS. 4 and 5, the ripple current 48 has a fundamental AC frequency that is selected to measure a particular AC impedance for purposes of extracting a particular parameter of the fuel cell system and/or observing the condition of the fuel cell system, as further described below. The ripple voltage 45 also has the fundamental frequency; and the ripple voltage 45 is shifted in time with respect to the ripple current 48 as represented by a phase difference 54.

The magnitude of the AC impedance at the frequency of interest is a function of the magnitude $\Delta v$ of the ripple voltage 45, the magnitude $\Delta i$ of the ripple current 48 and the phase shift 54 between the ripple current 48 and ripple voltage 45. The magnitude and phase may be represented by a phasor that specifically indicates AC impedance, and that phasor may be plotted over a spectrum of frequencies. This plot, called a Nyquist plot, is a plot of the imaginary part of the impedance phasor versus the real part of the impedance phasor. The intercept points of the Nyquist plot correspond to specific parts of the fuel cell reaction, yielding valuable insight into the fuel cell health.

Figure 6:
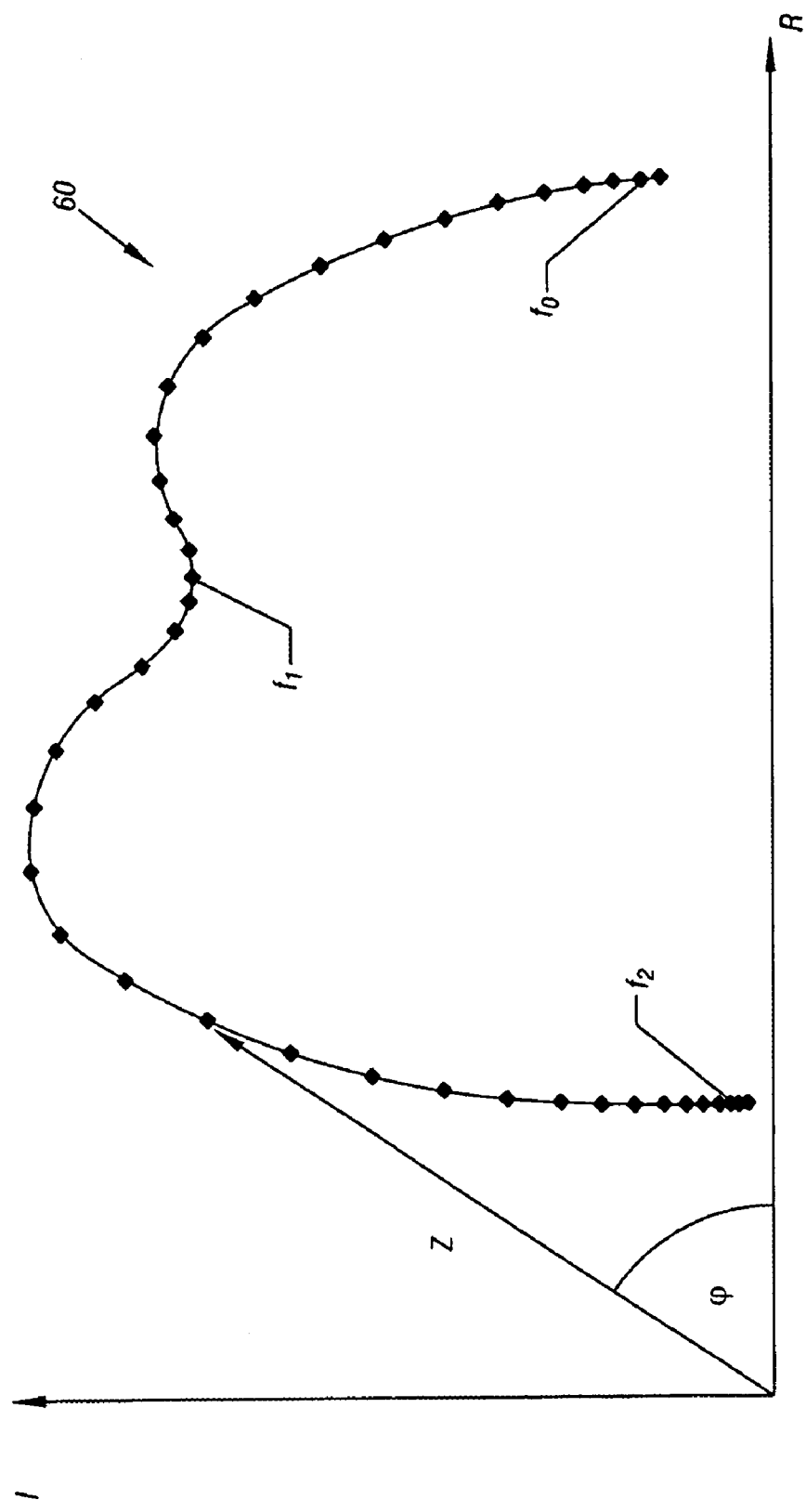
FIG. 6 depicts an exemplary Nyquist plot for a fuel cell system according to an embodiment of the invention.

FIG. 6 depicts an exemplary Nyquist plot 60 for a fuel cell. The portion of the plot 60 labeled with the identifier $f_0$ represents the low frequency AC impedance of the fuel cell. The $f_0$ frequency impedance is an indicator of mass transport impedance, or how well the system is delivering reactants to the catalyst of the fuel cell; and the mass transport impedance increases if the gas diffusion layer or flow field is clogged with liquid water, if the reactant partial pressure decreases or if the stoichiometric flow decreases. The portion of the plot 60 that is identified by the reference "$f_1$"

identifies a slightly higher impedance region (an impedance around 4 Hz, for example) that is an indicator of catalyst kinetics. The $f_0$ impedance increases if the catalyst is damaged or deactivated, for example, if the catalyst is poisoned with carbon monoxide.

The portion of the plot 60 that is labeled with the identifier "$f_2$" identifies the high frequency (a frequency around 1000 Hz, for example) AC impedance. The $f_2$ impedance represents the DC part of the impedance of a fuel cell. For example, if the stack is not compressed enough or if the current collectors corrode over time, the $f_2$ impedance correspondingly increases. The $f_2$ impedance is also an indicator of membrane hydration. More specifically, the $f_2$ impedance indicates whether the reactants are subsaturated, the membrane dries out, and/or the impedance to the transfer of protons increases.

Figure 7:
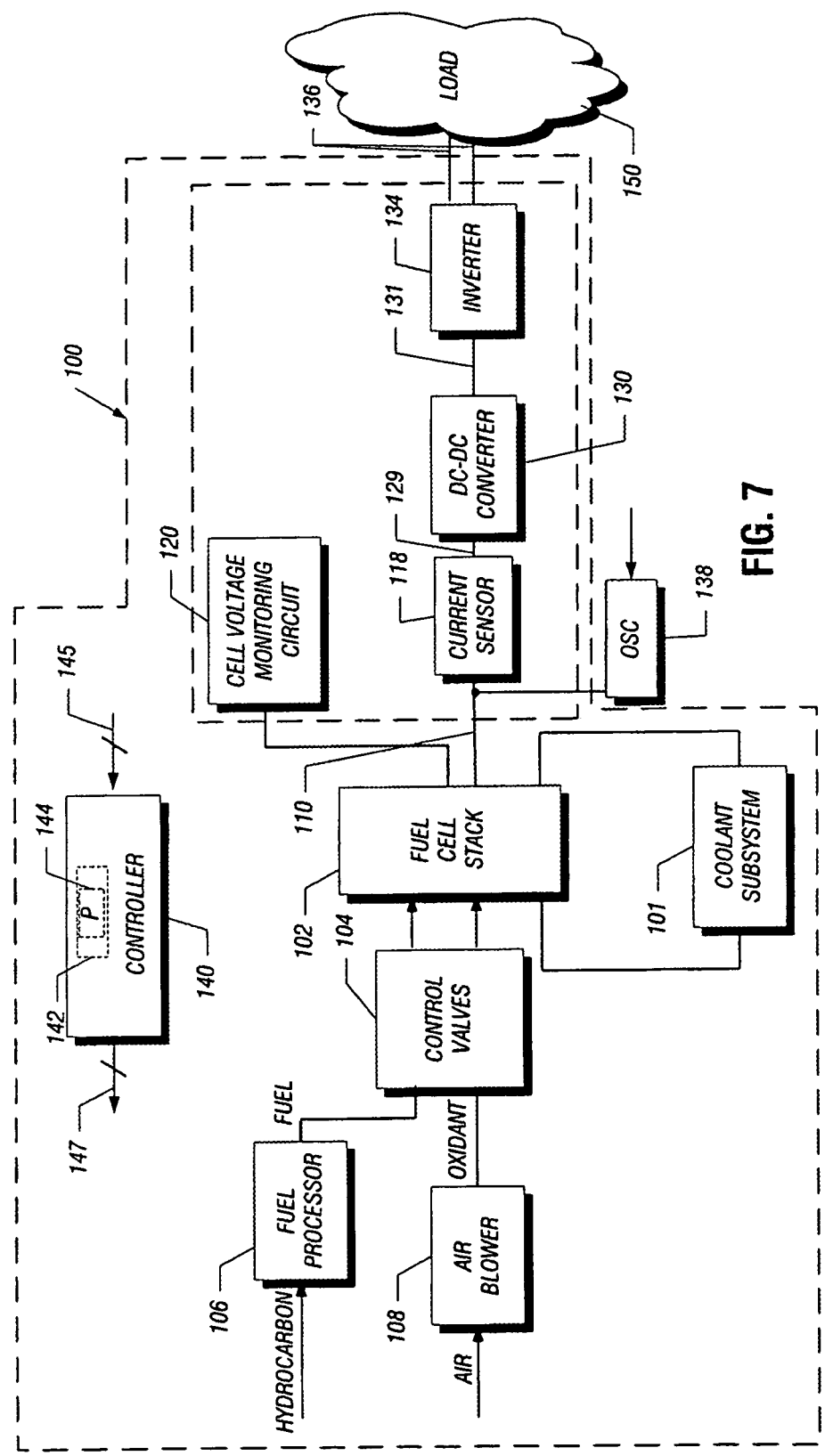
FIG. 7 is a schematic diagram of a fuel cell system according to an embodiment of the invention.

As a more specific example, FIG. 7 depicts a fuel cell system 100 in accordance with an embodiment of the invention. The fuel cell system 100 includes a fuel cell stack 102 that, in response to fuel and oxidant flows provided by a fuel processor 106 and an air blower 108, respectively, produces a stack voltage on an output terminal 110. Power conditioning circuitry 116 of the fuel cell system 100 conditions this DC output from the fuel cell stack 102 to produce an AC voltage that appears on output terminals 136 of the system 100. A load 150 may be coupled to the output terminals 136 as a fuel cell system 100 to receive power from the system 100. In some embodiments of the invention, the fuel cell system 100 may be selectively connected to provide power to a power grid.

The power conditioning circuitry 116 includes a DC-to-DC converter 130 that converts the stack voltage into an appropriate DC level for an inverter 134. More specifically, the DC-to-DC converter 130 has an output terminal 131 that is coupled to the inverter 134 for purposes of furnishing a particular DC level to the inverter 134. The inverter 134, in turn, converts this DC input voltage into an AC voltage that appears on the output terminals 136.

The power conditioning circuitry 116 also includes components to measure currents and voltages of the fuel cell system 100. For example, in some embodiments of the invention, the power conditioning circuitry 116 includes a current sensor 118 that is coupled in series with the output terminal 110 between the terminal 110 and an input terminal 129 of the converter 130. Thus, the current sensor 118, in some embodiments of the invention, provides an indication of the stack current, i.e., the current flowing through the fuel cell stack 102. The power conditioning circuit 116 may also include a cell voltage monitoring circuit 120, a circuit that provides an indication of the stack voltage, as well as indications from one, or more (all, for example) voltages of the fuel cell stack 102. In some embodiments of the invention, the cell voltage monitoring circuit 120 may scan the voltages of the fuel cell stack 102 and provide indications of each scan voltage.

In some embodiments of the invention, a controller 140 (a microprocessor or microcontroller, as just a few examples) receives the indications of currents and voltages from the current sensor 118 and the cell voltage monitoring circuit 120 for purposes of monitoring various conditions of the fuel cell system 100. The input terminals 145 of the controller 140 may also receive various sensed conditions and parameters from other sensors throughout the fuel cell system 100. In response to the sensed parameters and conditions, the controller 140 may control various aspects of the fuel cell system 100 via output control lines 147.

For example, in some embodiments of the invention, the controller 140 may use the output terminals 147 to control the rate of fuel produced by the fuel processor 106, control valves 104 that communicate the fuel and oxidant flows to the fuel cell stack 102, control the coupling of the fuel cell system 100 to the load 150, regulate the DC-to-DC converter 130, regulate operation of the inverter 134, regulate operation of a coolant subsystem 101, etc. For purposes of performing these various functions, in some embodiments of the invention, the controller 140 may be coupled to or contain a memory 142 that stores program instructions 144 that cause the controller 140, when the controller 140 executes the instructions 144, to perform various techniques. One of these techniques, in accordance with some embodiments of the invention, is the measurement of the AC impedance of the fuel cell system 100, as further described below.

In some embodiments of the invention, the fuel cell system 100 includes an oscillator 138 that is coupled to the stack terminal 110 for purposes of introducing a small ripple current into the stack current output at the frequencies of interest. The ripple current introduced by the oscillator 138 is small enough so that the operation of the fuel cell system 100 is not substantially disrupted. However, the magnitude of this ripple current is large enough for the $\Delta v$ and $\Delta i$ signals to be measured to derive the measured AC impedance.

As a more specific example, the oscillator 138 may be an analog oscillator. However, in other embodiments of the invention, the oscillator 138 may be replaced with other components to generate the ripple current. For example, in some embodiments of the invention, software of the computer system 100 may be executed to cause the DC-DC converter 130, inverter or other power conditioning device that the stack is powering to generate the ripple current.

Figure 8:
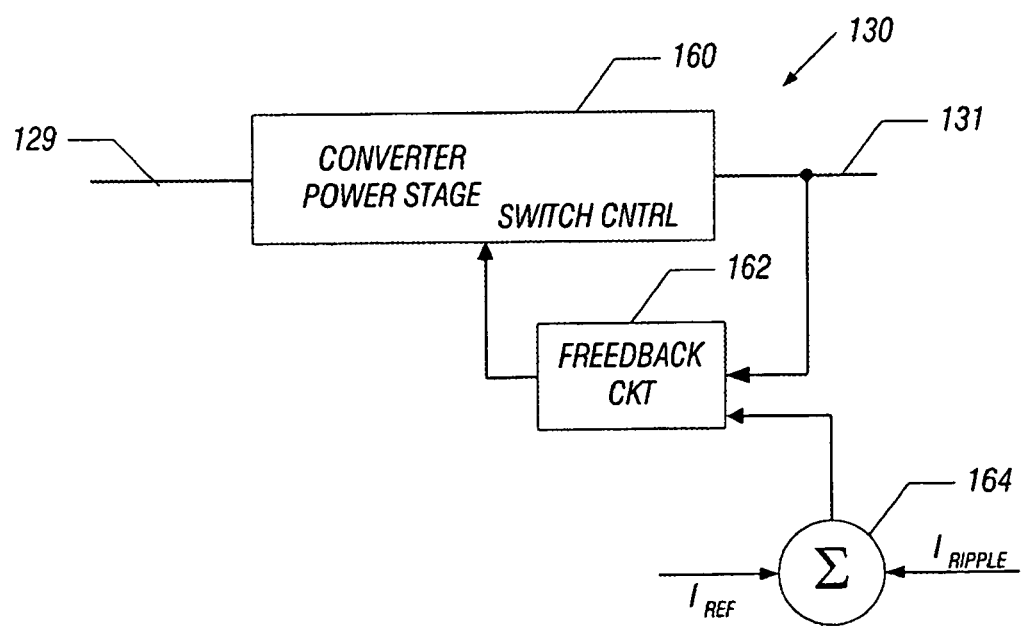
FIG. 8 is a schematic diagram of a converter of the system of FIG. 7 according to an embodiment of the invention.

Furthermore, in some embodiments of the invention, a particular component of the power conditioning circuitry 116 may use hardware other than the oscillator 138 for purposes of introducing the ripple current. For example, referring also to FIG. 8, in some embodiments of the invention, the DC-DC converter 130 may include an adder 164 for purposes of introducing a ripple current ($I_{RIPPLE}$) into the stack current. More specifically $I_{RIPPLE}$ current is received at one terminal of the adder 164. Another terminal of the adder 164 receives a reference current (called $I_{REF}$). The adder 164 adds these two components together and provides them to a reference input terminal of a feedback circuit 162.

The feedback circuit 162, as its name implies, senses an output current of the converter 160 and generates a corresponding switch control signal that is applied to a converter power stage of the converter 130. For example, the converter power stage 160 may be a Buck switching converter whose switching cycle is modulated by the feedback circuit 162 for purposes of regulating the output current of a converter 160. The feedback circuit 162 compares the sensed current from the stage 160 with the current signal provided by the adder 164. Due to the addition of the ripple current component by the adder 164, the feedback circuit 162 modulates the switching action of the stage 160 to produce the ripple current that appears at the output terminal 131 of the stage 160. Thus, in essence, the converter 130 superimposes the ripple current onto the stack current.

As mentioned above, many other variations are possible for purposes of introducing the ripple current into the fuel cell system 100.

In some embodiments of the invention, for purposes of measuring the ripple voltage that is a result of the injected ripple current, the fuel cell system 100 uses the cell voltage monitoring circuit 120. More specifically, the cell voltage monitoring circuit 120 may provide either a stack voltage, a group of cell voltages, or any particular cell voltage to the controller 140. Thus, using the cell voltage monitoring circuit 120, the controller 140 observes the ripple voltage produced by the ripple current. In some embodiments of the invention, the controller 140 may use a Fast Fourier transform (FFT) to filter the measured voltage to extract the ripple voltage at the desired frequency of interest. Having also knowledge of the ripple voltage, the controller 140 may then calculate the AC impedance.

In other embodiments of the invention, an analog circuit, such as an amplitude modulation (AM) circuit, for example, may subject the measured cell or stack voltage to a band pass filter to extract the ripple voltage at the frequency of interest. Other variations are possible.

As discussed above, the fuel cell system 100 may include a component, such as the oscillator 138 that injects the ripple current into the fuel cell system. The current sensor 118 provides a measurement of the actual ripple component that is superimposed on the stack current. Once again, the controller 140 may, for example, in some embodiments of the invention, use an FFT routine for purposes of extracting the ripple component at the desired frequency of interest. Alternatively, in some embodiments of the invention, the fuel cell system 100 may use, for example, an analog circuit with a band pass filter to tune in on and measure the ripple current at the frequency of interest. Other variations are possible in other embodiments of the invention.

In some embodiments of the invention, the controller 140 calculates the magnitudes of the ripple voltage and ripple current components, calculates the phase between these two components and as a result, calculates the AC impedance.

All of the above-described actions by the controller 140 may be performed pursuant to the controller 140 executing the program instructions 144, in some embodiments of the invention.

Figure 9:
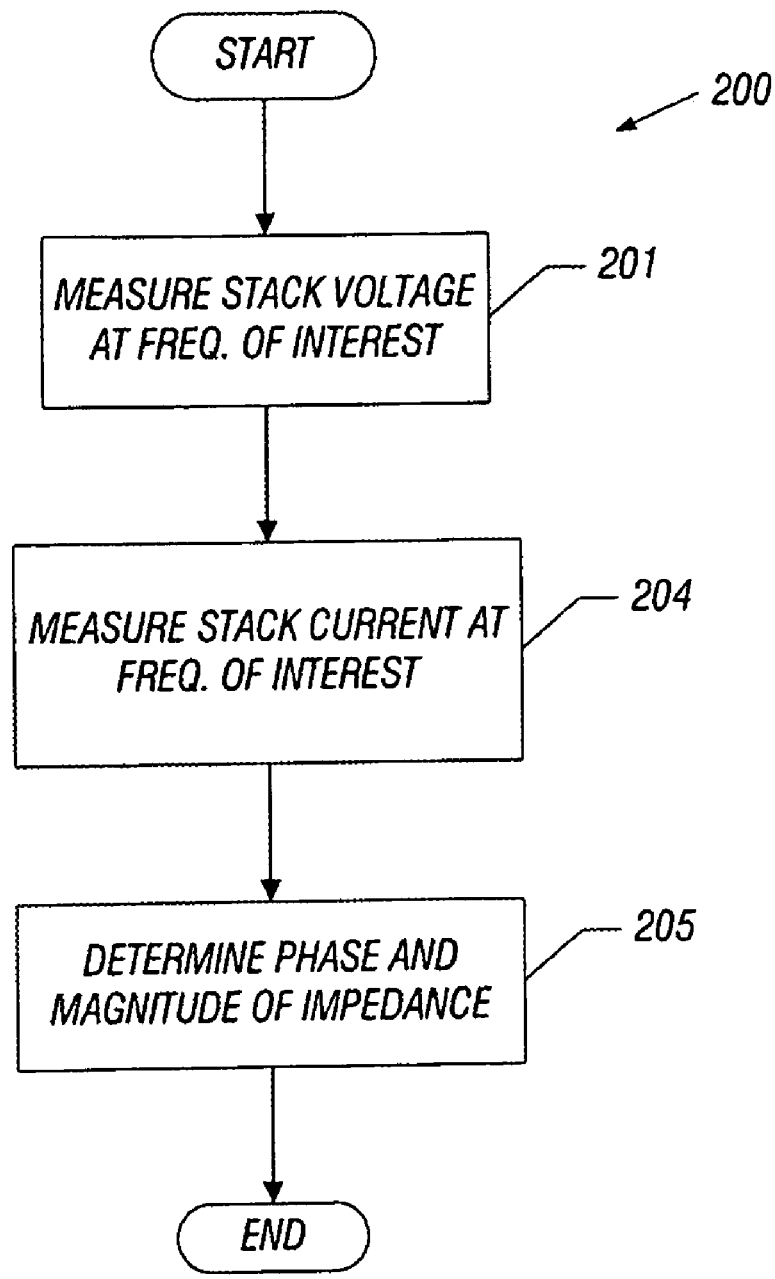

Thus, to summarize, the fuel cell system 100, in some embodiments of the invention, may perform a technique 200 that is depicted in FIG. 9. Referring to FIG. 9, pursuant to this technique, the fuel cell system 100 measures (block 201) the stack voltage at a frequency of interest. The fuel cell system 100 also measures (block 204) the stack current at the frequency of interest. From these measured parameters, the fuel cell system 100 determines the phase and magnitude of the AC impedance, as depicted in block 205.

Figure 10:
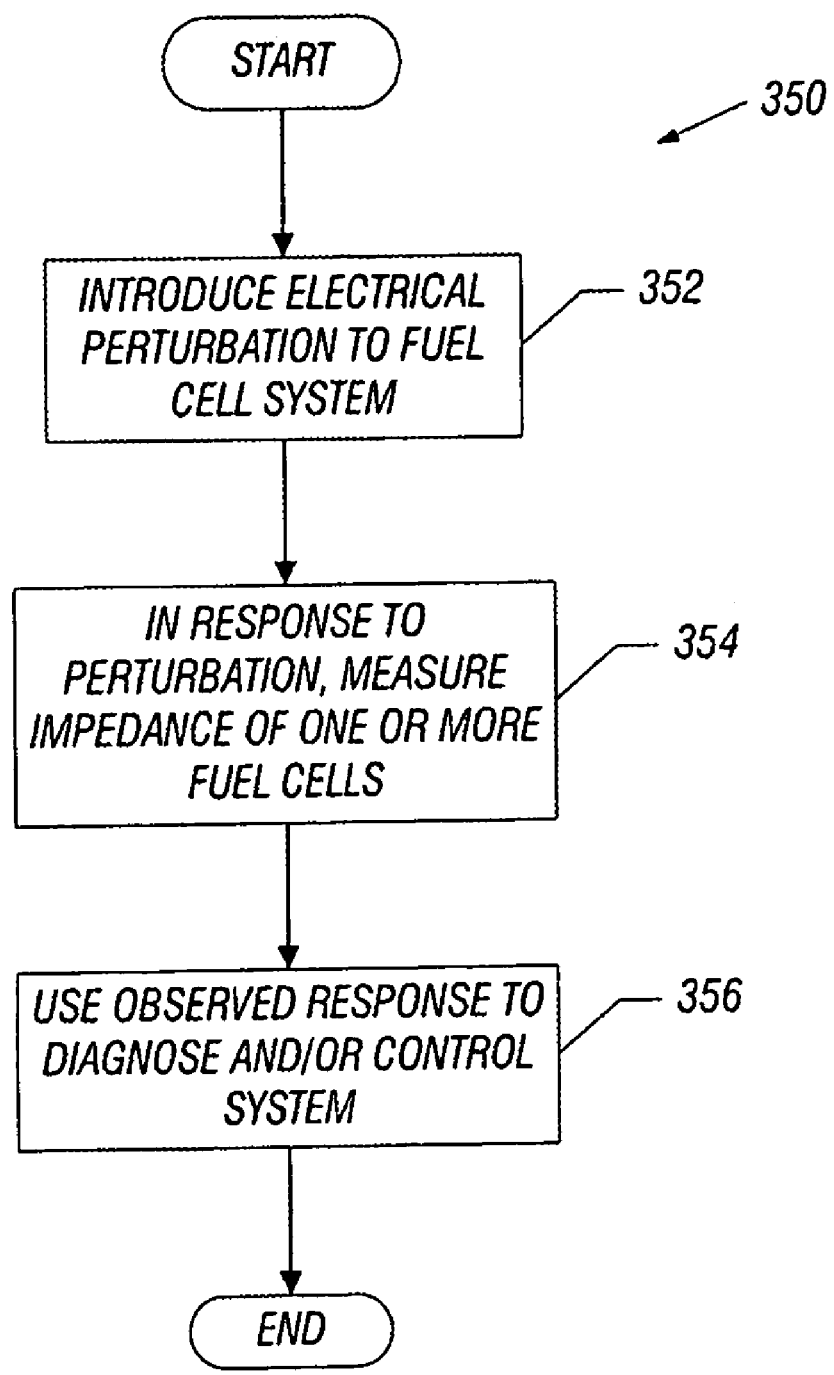

Referring to FIG. 10, the AC impedance is a direct indicator of stack health and may be a valuable diagnostic tool for the system. The stack performance degradation within an integrated system is currently difficult to quantify solely via stack voltage and current, because these indicators can vary, depending on the battery charging state, the power level, the auxiliary loads and other factors. Moreover, AC impedance can indicate what part of the fuel cell reaction is limiting, giving clues as to what is wrong with the system stack. As discussed above in connection with FIG. 6, the AC impedance, depending on the particular frequency, may be indicators of mass transport impedance, catalyst kinetics and the DC impedance of the fuel cell. Thus, given that a given an ideal model for stack impedance at these frequencies, the AC impedance measurement may be used within closed-loop feedback control techniques for automatic system control of such parameters as reactant stoich, reactant humidification, carbon monoxide output via a preferential oxidizers (PrOx) air injection level (to consume carbon monoxide in the reformate), liquid coolant flow rate/temperature rise, radiator/cooling fan speed and other parameters.

The AC impedance gives immediate warnings to field-service engineers and technicians of many common damaging inputs the stack, before these failure modes permanently damage the stack. For example, the lack of water drainage or severe flooding (perhaps due to a humidification module failure) may result in catalyst damage over time. This problem, however, is reflected when low frequency impedance immediately, whereas the problem may only be evident in the stack voltage after the damage has been done. Alarms may be set for the system to contact field service automatically for maintenance of shutdown if a problem is detected.

The AC impedance potentially enables a control engineer to dramatically simply the system's measurement and control system. The stack thus, may be a carbon monoxide sensor, a hydrogen sensor, an oxygen sensor and a humidification sensor. Thus, eliminating these sensors may reduce the overall system costs and boost the reliability of the fuel cell system.

Therefore, referring to FIG. 10, in accordance with some embodiments of the invention, a technique 350 may be used. The technique 350 includes introducing (block 352) an electrical perturbation to a fuel cell system. In response to this perturbation, the AC impedance of one or more of the fuel cells of the stack are measured, as depicted in block 354. The observed response of the system to this perturbation is then used (block 356) to diagnosis and/or control the fuel cell system.

The stack voltage is not the only parameter that may be measured. In this manner, the impedances of individual cell voltages may be measured for purposes of diagnosing and/or controlling the fuel cell system. More specifically, top-to-bottom differences within the stack, as well as end cell effects are potentially indicative of problems or issues that could be mitigated by system operating conditions. By measuring the impedances of individual cells, differences may be measured around the perimeter of the stack, for example, from the coolant inlet side to the coolant outlet side. This measurement may indicate any number of thermal or water management phenomena, such as the condensation of water from the reactant streams.

Figure 11:
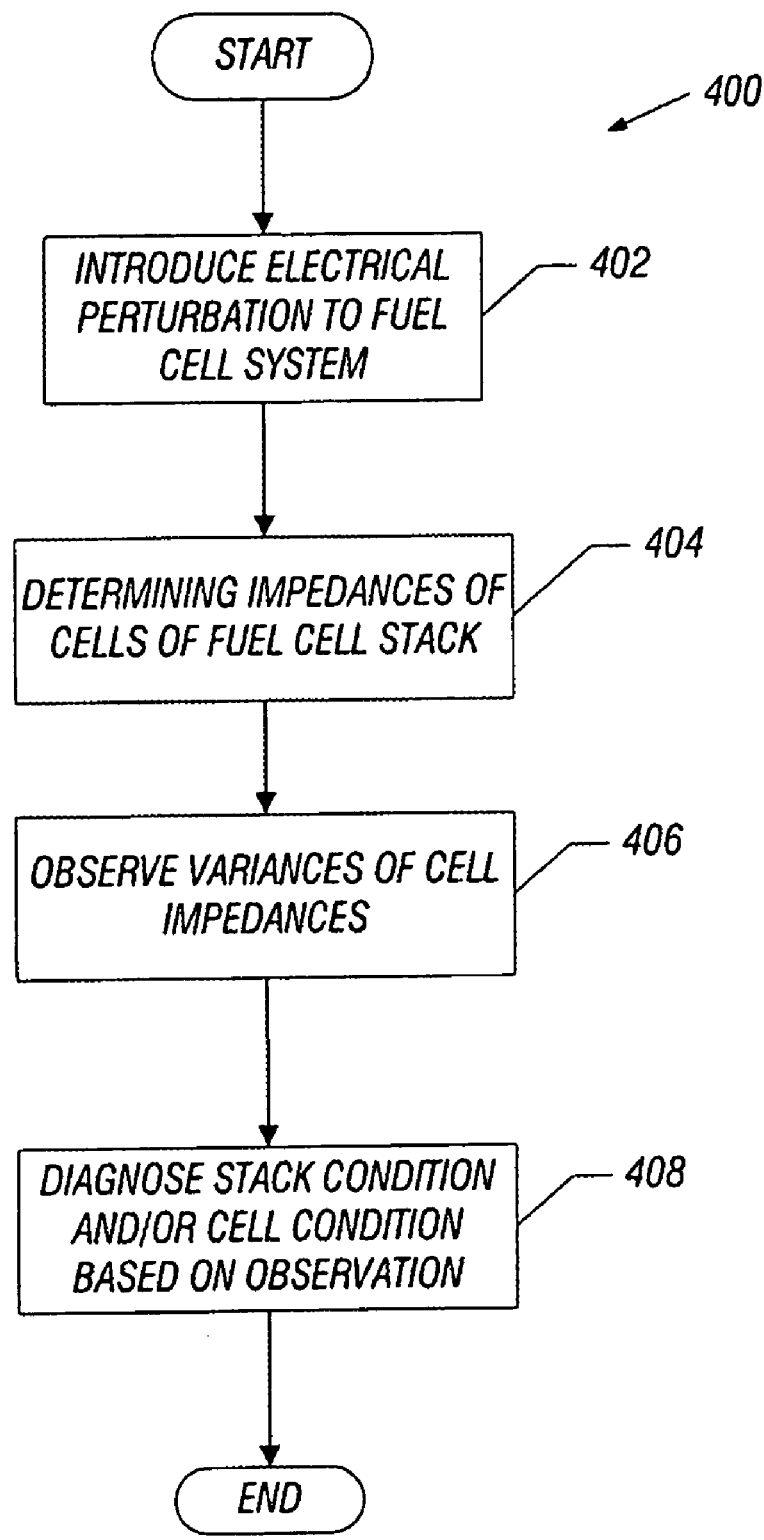

Thus, in accordance with some embodiments of the invention, a technique 400 that is depicted in FIG. 11 may be used. The technique 400 includes introducing (block 402) an electrical perturbation to a fuel cell system. The technique 100 includes determining (block 404) the impedances of cells of the fuel cell stack and observing (block 406) the variances of the cell impedances. The stack condition and/or cell condition is then diagnosed and possibly controlled based on the observation, as depicted in block 408.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:

during the operation of a fuel cell system, introducing an electrical perturbation to the fuel cell system, the electrical perturbation not substantially disrupting the operation of the fuel cell system;

selecting a frequency of the perturbation to target a performance characteristic of the fuel cell system;

in response to the perturbation, measuring an electrical parameter of the fuel cell system; and automatically controlling the fuel cell system in response to the measurement of the electrical parameter, the controlling comprising controlling at least one of a reactant stoichiometry and a reactant humidification.

2. The method of claim 1, further comprising:

performing at least one of the introducing and measuring by circuitry used in the operation of the fuel cell system.

3. The method of claim 1, wherein the act of selecting comprises selecting the frequency to generate an indication of one of a mass transport impedance, catalyst kinetics and a DC impedance of a fuel cell of the fuel cell system.

4. The method of claim 1, wherein the electrical perturbation comprises a ripple current.

5. The method of claim 3, wherein the magnitude of the ripple current is approximately five percent or less of the magnitude of an output current existing in a fuel cell stack of the fuel cell system.

6. The method of claim 1, wherein the introducing comprises:

using a frequency of the electrical perturbation to select the electrical parameter to be observed from a group of other electrical parameters selected by other frequencies.

7. The method of claim 1, wherein the introducing comprises:

introducing the electrical perturbation near an external load to the fuel cell system.

8. The method of claim 1, wherein the measuring comprises:

measuring the electrical parameter near a stack of the fuel cell system.

9. The method of claim 1, further comprising:

using the measured electrical parameter to diagnose a condition of the fuel cell system.

10. The method of claim 1, wherein the electrical parameter comprises a voltage of one or more cells of a fuel cell stack of the fuel cell system.

11. The method of claim 1, wherein the measuring indicates at least one of a carbon monoxide level, hydrogen level oxygen level and humidification level.

12. A system comprising:

a fuel cell stack; and a circuit adapted to:

introduce an electrical perturbation to the fuel cell stack, the electrical perturbation not substantially disrupting operation of the fuel cell stack, in response to the perturbation, select one of a plurality of frequencies to measure a performance characteristic of the fuel cell stack, each of the other said plurality of frequencies being indicative of at least one other performance characteristic of the stack, control the fuel cell system in response to the measurement of the performance characteristic, and control at least one of a reactant stoichiometry and a reactant humidification in response to the measurement of the performance characteristic.

13. The system of claim 12, wherein the circuit is further adapted to be used in the operation of the fuel cell stack.

14. The system of claim 12, wherein the electrical perturbation comprises a ripple current.

15. The system of claim 14, wherein the magnitude of the ripple current is approximately five percent or less of the magnitude of an output current existing in a fuel cell stack of the fuel cell system.

16. The system of claim 12, wherein the selected frequency targets a mass transport characteristic.

17. The system of claim 16, wherein the selected frequency targets a catalyst kinetics characteristic.

18. The system of claim 16, wherein the selected parameter targets a DC resistance of the fuel cell stack.

19. The system of claim 12, wherein the circuit is adapted to:

introduce the electrical perturbation near a load of a fuel cell system.

20. The system of claim 12, wherein the circuit is adapted to:

use the measured performance characteristic to diagnose a health of the fuel cell system.

21. The system of claim 12, wherein the selected frequency targets at least one of a carbon monoxide level, a hydrogen level, an oxygen level and a humidification level.

22. A method comprising:

during the operation of a fuel cell system, introducing an electrical perturbation to the fuel cell system, the electrical perturbation not substantially disrupting the operation of the fuel cell system;

selecting a frequency of the perturbation to target a performance characteristic of the fuel cell system;

in response to the perturbation, measuring an electrical parameter of the fuel cell system; and selectively automatically generating an alarm in response to the measuring.

23. A system comprising:

a fuel cell stack; and a circuit adapted to:

introduce an electrical perturbation to the fuel cell stack, the electrical perturbation not substantially disrupting operation of the fuel cell stack, in response to the perturbation, select one of a plurality of frequencies to measure a performance characteristic of the fuel cell stack, each of the other said plurality of frequencies being indicative of at least one other performance characteristic of the stack, and selectively generate an alarm in response to the measurement of the performance characteristic.

* * * * *